United States Patent
Liang et al.

(10) Patent No.: US 10,165,378 B2
(45) Date of Patent: Dec. 25, 2018

(54) SPEAKER MODULE, DISPLAY DEVICE HAVING A SPEAKER MODULE, AUDIO ADJUSTMENT SYSTEM AND CONTROL METHOD THEREOF, AND SYNCHRONIZATION METHOD FOR PLAYING MULTI-LANGUAGE SOUND

(71) Applicant: Wistron Corp., New Taipei (TW)

(72) Inventors: Chen-Yi Liang, New Taipei (TW);
Che-Wen Liu, New Taipei (TW);
Jia-Hung Lee, New Taipei (TW)

(73) Assignee: WISTRON CORP., New Taipei (TW)

( * ) Notice: Subject to any disclaimer, the term of this patent is extended or adjusted under 35 U.S.C. 154(b) by 36 days.

(21) Appl. No.: 14/546,805

(22) Filed: Nov. 18, 2014

(65) Prior Publication Data

US 2016/0021454 A1 Jan. 21, 2016

(30) Foreign Application Priority Data

Jul. 18, 2014 (TW) .............................. 103124776 A

(51) Int. Cl.
*H04R 1/32* (2006.01)
*H04R 3/00* (2006.01)
(Continued)

(52) U.S. Cl.
CPC ............. *H04R 27/00* (2013.01); *H04R 1/403* (2013.01); *H01F 3/08* (2013.01); *H01F 19/04* (2013.01);
(Continued)

(58) Field of Classification Search
CPC ........ H04R 1/42; H04R 9/04; H04R 2499/05; H04R 17/00; H04R 2430/20;
(Continued)

(56) References Cited

U.S. PATENT DOCUMENTS 5,304,747 A * 4/1994 Hale, II ............... H04R 1/2811
181/156
5,900,907 A * 5/1999 Malloy .................. H04N 7/142
348/14.1
(Continued)

FOREIGN PATENT DOCUMENTS

CN 2634772 Y 7/2003
CN 101593472 B 7/2011
(Continued)

OTHER PUBLICATIONS

Taiwan Office Action for corresponding application No. 103124776 dated Feb. 1, 2016.
(Continued)

*Primary Examiner* — Davetta W Goins
*Assistant Examiner* — Kuassi Ganmavo
(74) *Attorney, Agent, or Firm* — Maschoff Brennan

(57) ABSTRACT

A display device having a speaker module includes a display, an ultrasonic speaker and an adjustment module. The speaker module includes at least one first speaker module and at least one second speaker module. The first speaker module is disposed at the display and adapted to emit a first ultrasonic wave. The second speaker module is disposed at the display and adapted to emit a second ultrasonic wave. The first ultrasonic wave and the second ultrasonic wave are intersected to form an audible region. The adjustment module is adapted to control the first speaker module and the second speaker module to rotate relative to the display, so as to drive the audible region to target a user.

12 Claims, 16 Drawing Sheets

(51) Int. Cl.
  *H04R 1/02*   (2006.01)
  *H04R 27/00*  (2006.01)
  *H04R 1/40*   (2006.01)
  *H04N 21/439*     (2011.01)
  *H01F 3/08*       (2006.01)
  *H01F 19/04*      (2006.01)
  *H04N 21/441*     (2011.01)
  *H04R 17/00*      (2006.01)
  *H04S 7/00*       (2006.01)

(52) U.S. Cl.
  CPC ......... *H04N 21/439* (2013.01); *H04N 21/441* (2013.01); *H04R 1/026* (2013.01); *H04R 17/00* (2013.01); *H04R 2201/025* (2013.01); *H04R 2217/03* (2013.01); *H04R 2430/20* (2013.01); *H04R 2499/11* (2013.01); *H04R 2499/15* (2013.01); *H04S 7/303* (2013.01)

(58) Field of Classification Search
  CPC ....... H04R 2217/03; H01F 3/08; H01F 19/04; G10K 11/175; H04N 21/4418; H04N 21/4316; H04N 21/439
  USPC .......... 381/106, 75, 118, 61, 77–79, 97, 98, 381/55–59, 116, 333; 367/118, 137, 138; 348/564, 738
  See application file for complete search history.

(56) References Cited

U.S. PATENT DOCUMENTS

| | | | | |
|---|---|---|---|---|
| 6,005,642 | A * | 12/1999 | Meisner | H04R 5/02 348/827 |
| 6,643,377 | B1 * | 11/2003 | Takahashi | H04S 1/00 181/155 |
| 6,741,273 | B1 * | 5/2004 | Waters | H04S 7/302 348/61 |
| 7,012,506 | B2 * | 3/2006 | Rich | A01M 29/18 340/384.2 |
| 8,077,198 | B2 | 12/2011 | Chen et al. | |
| 8,111,865 | B2 * | 2/2012 | Lau | H04R 1/026 381/386 |
| 8,929,569 | B2 | 1/2015 | Wu et al. | |
| 2002/0161577 | A1 | 10/2002 | Smith | |
| 2003/0118198 | A1 * | 6/2003 | Croft, III | G10H 1/0091 381/77 |
| 2004/0135476 | A1 * | 7/2004 | Gillengerten | A47B 81/061 312/8.16 |
| 2004/0208324 | A1 * | 10/2004 | Cheung | H04S 1/00 381/77 |
| 2005/0207590 | A1 * | 9/2005 | Niehoff | G10K 15/02 381/77 |
| 2007/0140508 | A1 * | 6/2007 | Soerensen | H04N 5/642 381/87 |
| 2007/0169555 | A1 * | 7/2007 | Gao | H04R 1/403 73/620 |
| 2010/0162285 | A1 * | 6/2010 | Cohen | H04H 60/31 725/12 |
| 2010/0277646 | A1 * | 11/2010 | Jeong | H04R 5/02 348/564 |
| 2012/0281858 | A1 * | 11/2012 | Margaliot | H04R 3/12 381/97 |
| 2013/0077803 | A1 * | 3/2013 | Konno | H04R 1/323 381/107 |
| 2013/0230200 | A1 * | 9/2013 | Lau | H04R 1/02 381/332 |
| 2013/0314610 | A1 * | 11/2013 | Yagihashi | H04N 5/60 348/738 |
| 2013/0322855 | A1 | 12/2013 | Huang | |
| 2014/0064524 | A1 * | 3/2014 | Bleacher | H04R 3/12 381/182 |
| 2014/0254811 | A1 * | 9/2014 | Takeda | H04S 7/303 381/58 |
| 2014/0369514 | A1 * | 12/2014 | Baym | G10K 11/178 381/71.1 |
| 2015/0326815 | A1 * | 11/2015 | Masuda | H04N 5/642 381/306 |

FOREIGN PATENT DOCUMENTS

| | | | |
|---|---|---|---|
| CN | 202077122 U | * | 12/2011 |
| CN | 103019644 A | | 4/2013 |
| CN | 103339963 A | | 10/2013 |
| CN | 103414992 A | | 11/2013 |
| EP | 2043381 A2 | | 4/2009 |
| TW | 301419 | | 3/1996 |
| TW | M317721 U | * | 8/2007 |
| TW | M317721 U | * | 8/2007 |
| TW | 200915899 A | | 4/2009 |
| TW | I368189 B | | 7/2012 |
| TW | M446470 U | | 2/2013 |
| TW | 201345273 A | | 11/2013 |
| TW | 201351393 A | | 12/2013 |

OTHER PUBLICATIONS

Office Action dated Aug. 29, 2016 as received in Application No. 105110763.
TW Office Action dated Jul. 28, 2017 as received in Application No. 105110763 (English Translation).
CN Office Action dated Nov. 29, 2017 as received in Application No. 201410369391.4.

* cited by examiner

SPEAKER MODULE, DISPLAY DEVICE HAVING A SPEAKER MODULE, AUDIO ADJUSTMENT SYSTEM AND CONTROL METHOD THEREOF, AND SYNCHRONIZATION METHOD FOR PLAYING MULTI-LANGUAGE SOUND

CROSS-REFERENCE TO RELATED APPLICATIONS

This non-provisional application claims priority under 35 U.S.C. § 119(a) on Patent Application No(s). 103124776 filed in Taiwan, R.O.C. on Jul. 18, 2014, the entire contents of which are hereby incorporated by reference.

BACKGROUND

Technical Field

The disclosure relates to an audio device. More particularly, the disclosure relates to an apparatus and a method for adjusting an audible region of the audio device.

Background

In recent years, electronic devices (such as cell phones, monitors, or tablet computers) are not only configured with displays for showing images or videos, but also have built-in speakers for providing audio for users. The built-in speakers are capable of playing sounds. However, it is annoying and unpleasant when the sounds are played in public by the built-in speakers. Accordingly, some friendly users may prepare earphones for listening to music to avoid bothering other people.

However, it is difficult to represent good quality original sounds by the earphones, and the earphones may harm the users hearing when being played too loud. Furthermore, every kind of the earphones (for example, earbud earphones, canal earphones or ear-clip earphones) may make the users feel uncomfortable if the users have been listening to music for a long period of time.

SUMMARY

One aspect of the disclosure provides a display device having a speaker module, which comprises a display and an ultrasonic speaker group. The ultrasonic speaker group comprises at least one first speaker module, at least one second speaker module and an adjustment module. The at least one first speaker module comprises a first seat and a first speaker. The first seat pivots on the display, for rotating about a first axis relative to the display. The first speaker pivots on the first seat, for rotating about a second axis relative to the first seat. The first speaker is adapted to emit a first ultrasonic wave, and the first axis and the second axis are orthogonal. The at least one second speaker module comprises a second seat and a second speaker. The second seat pivots on the display, for rotating about the first axis relative to the display. The second speaker pivots on the second seat, for rotating around the second axis relative to the second seat. The second speaker is adapted to emit a second ultrasonic wave, and the first ultrasonic wave and the second ultrasonic wave are intersected to form an audible region. The adjustment module comprises a photographic component, a distance sensing component and a control component. The photographic component is disposed at the display, for photographing and obtaining a user image. The distance sensing component is disposed at the display, for obtaining at least one user distance data according to the user image. The control component is adapted to control the first speaker and the second speaker to rotate relative to the display, so as to drive the audible region to target at least one user.

In another aspect of the disclosure provides an audio adjustment system, which comprises at least one first speaker module, at least one second speaker module an adjustment module. The at least one first speaker module is adapted to emit a first ultrasonic wave. The at least one second speaker module is adapted to emit a second ultrasonic wave. The first ultrasonic wave and the second ultrasonic wave are intersected to form an audible region. The adjustment module comprises a photographic component, a distance sensing component and a control component. The photographic component is adapted to photograph at least one user, for capturing a user image. The distance sensing component is adapted to position the at least one user according to the user image, for obtaining at least one user distance data. The control component is adapted to control the first speaker module and a rotational angle of the first speaker module according to the at least one user position data, a position data of the first speaker module and a position data of the second speaker module, so as to drive the audible region to target the at least one user.

In another aspect of the disclosure provides a control method for an audio adjustment system, which comprises: a user detection process is executed to obtain at least one user position data. An audible region of an ultrasonic speaker group is controlled to target the user according to the at least one user position data.

In another aspect of the disclosure provides a synchronization method for playing multi-language sound, which comprises: a user detection process is executed to obtain a first user position data and a second user position data. A first audible region of a first ultrasonic speaker group is controlled to target a first user according to the first user position data. A second audible region of a second ultrasonic speaker group is controlled to target a second user according to the second user position data. A first language data and a second language data are output from the first ultrasonic speaker group and the second ultrasonic speaker group, respectively.

In another aspect of the disclosure provides a speaker module which comprises a shell, a seat, and a speaker. The seat is located in and pivots on the shell, for rotating about a first axis relative to the shell. The speaker pivots on the seat for rotating about a second axis relative to the first seat. The speaker is capable of emitting an ultrasonic wave. The first axis and the second axis are orthogonal.

BRIEF DESCRIPTION OF THE DRAWINGS

The disclosure will become more fully understood from the detailed description given herein-below and the accompanying drawings which are given by way of illustration only and thus are not limitative of the disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
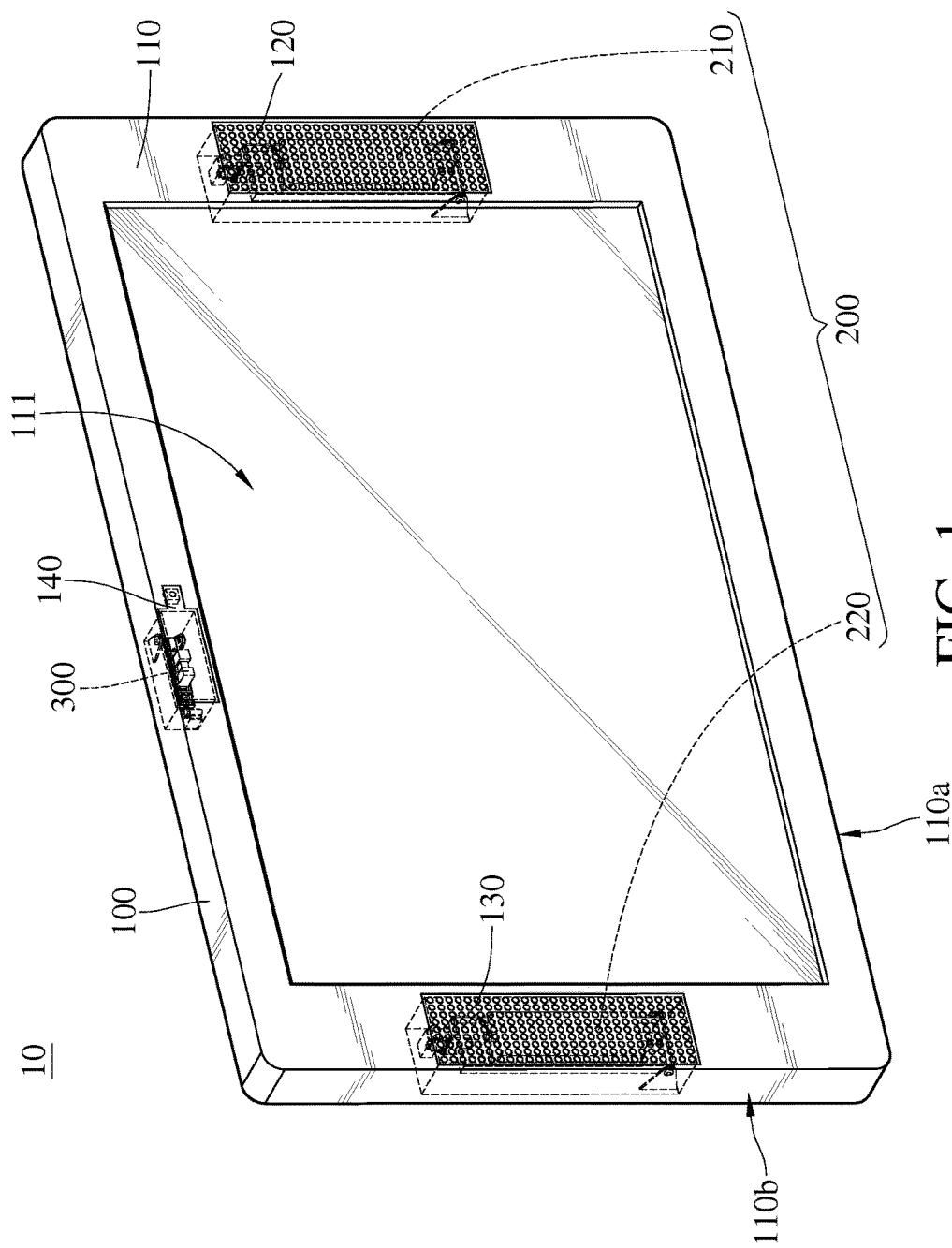
FIG. 1 is a perspective view of a display device having a speaker module according to a first embodiment of the disclosure.
Figure 2A:
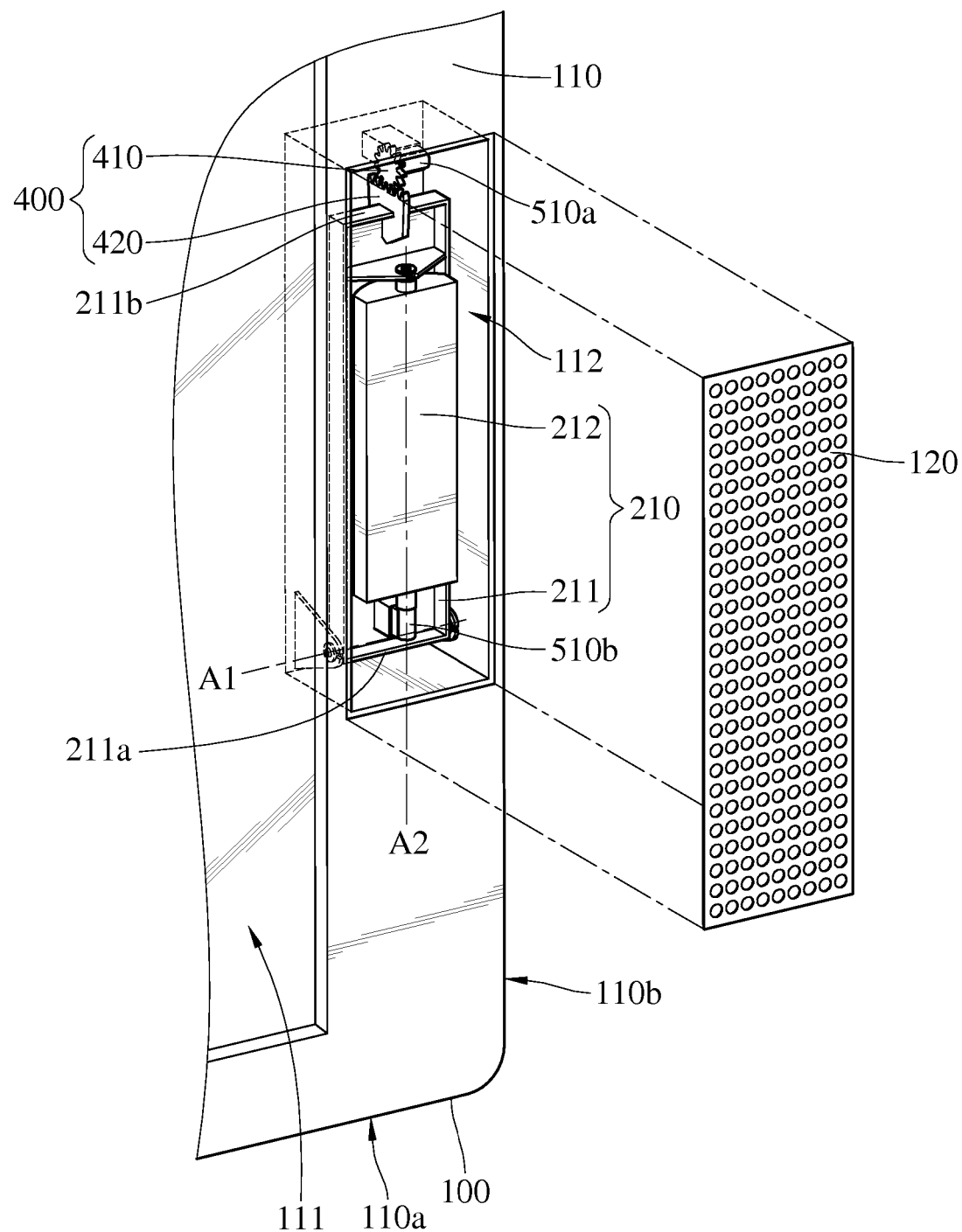
FIG. 2A is a partially exploded view of the display device in FIG. 1.
Figure 2B:
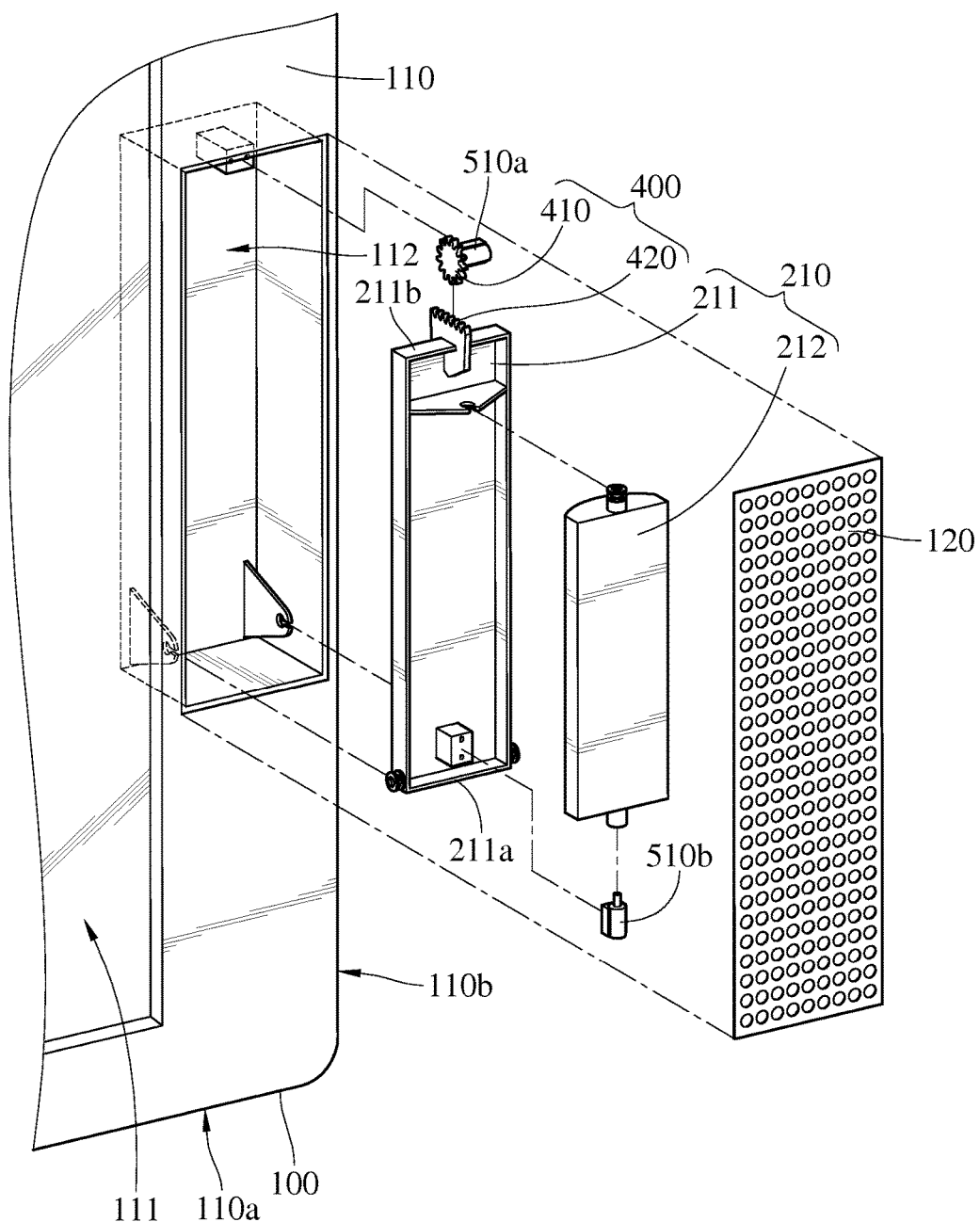
FIG. 2B is an exploded view of a first speaker module, a first transmission mechanism and a first drive module of the display device in FIG. 2A.
Figure 3A:
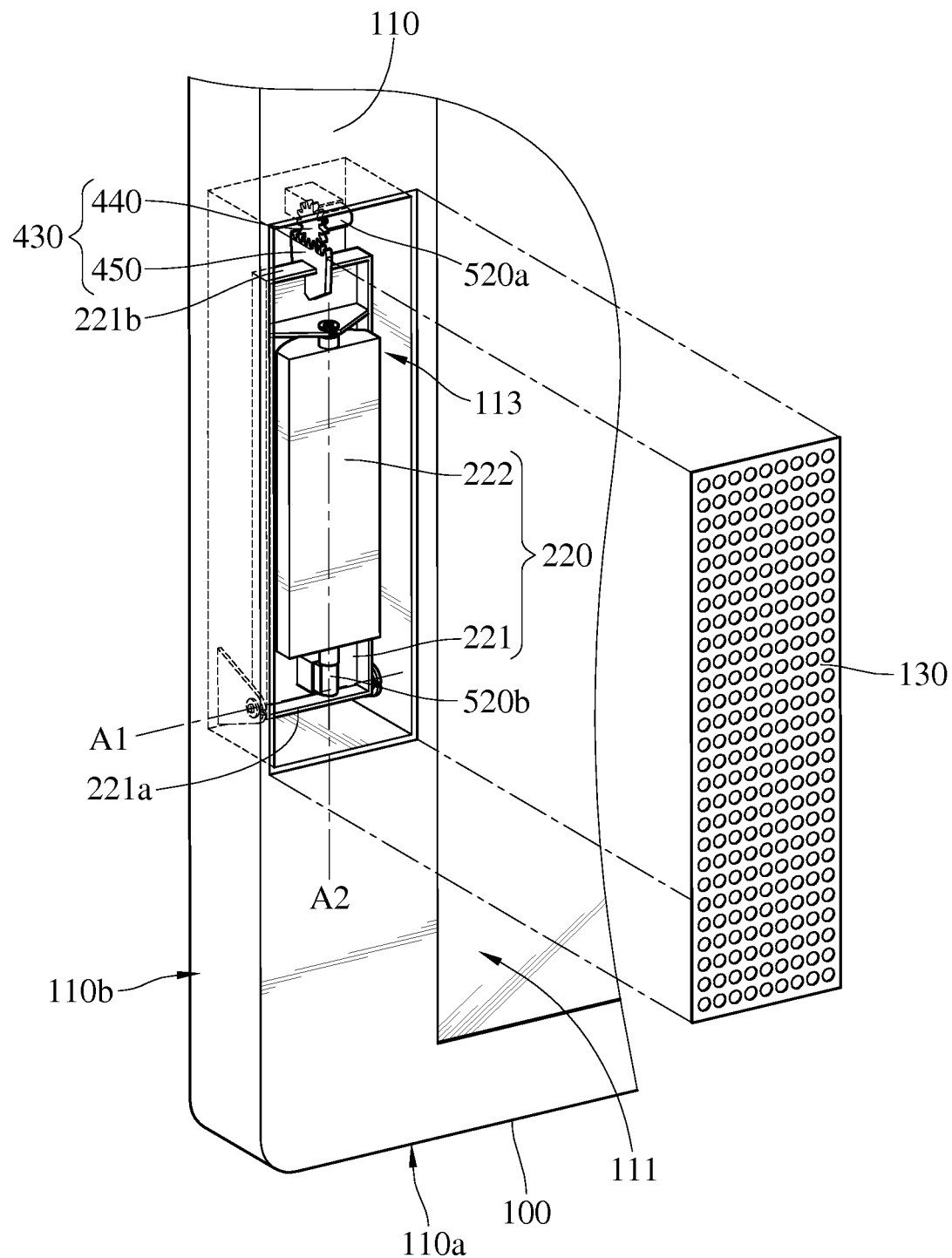
FIG. 3A is another partially exploded view of the display device in FIG. 1.
Figure 3B:
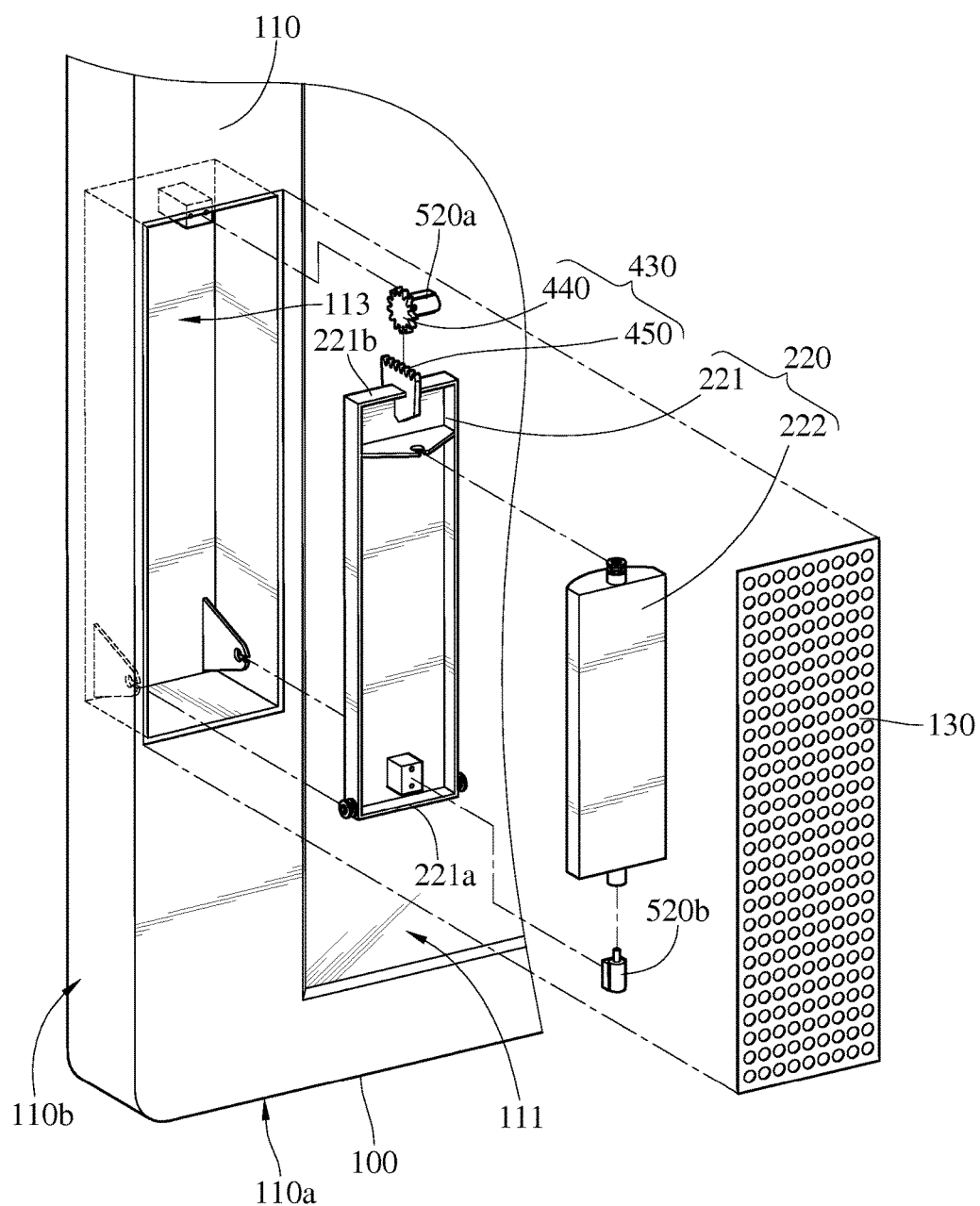
FIG. 3B is an exploded view of a second speaker module, a second transmission mechanism and a second drive module of the display device in FIG. 3A.
Figure 4A:
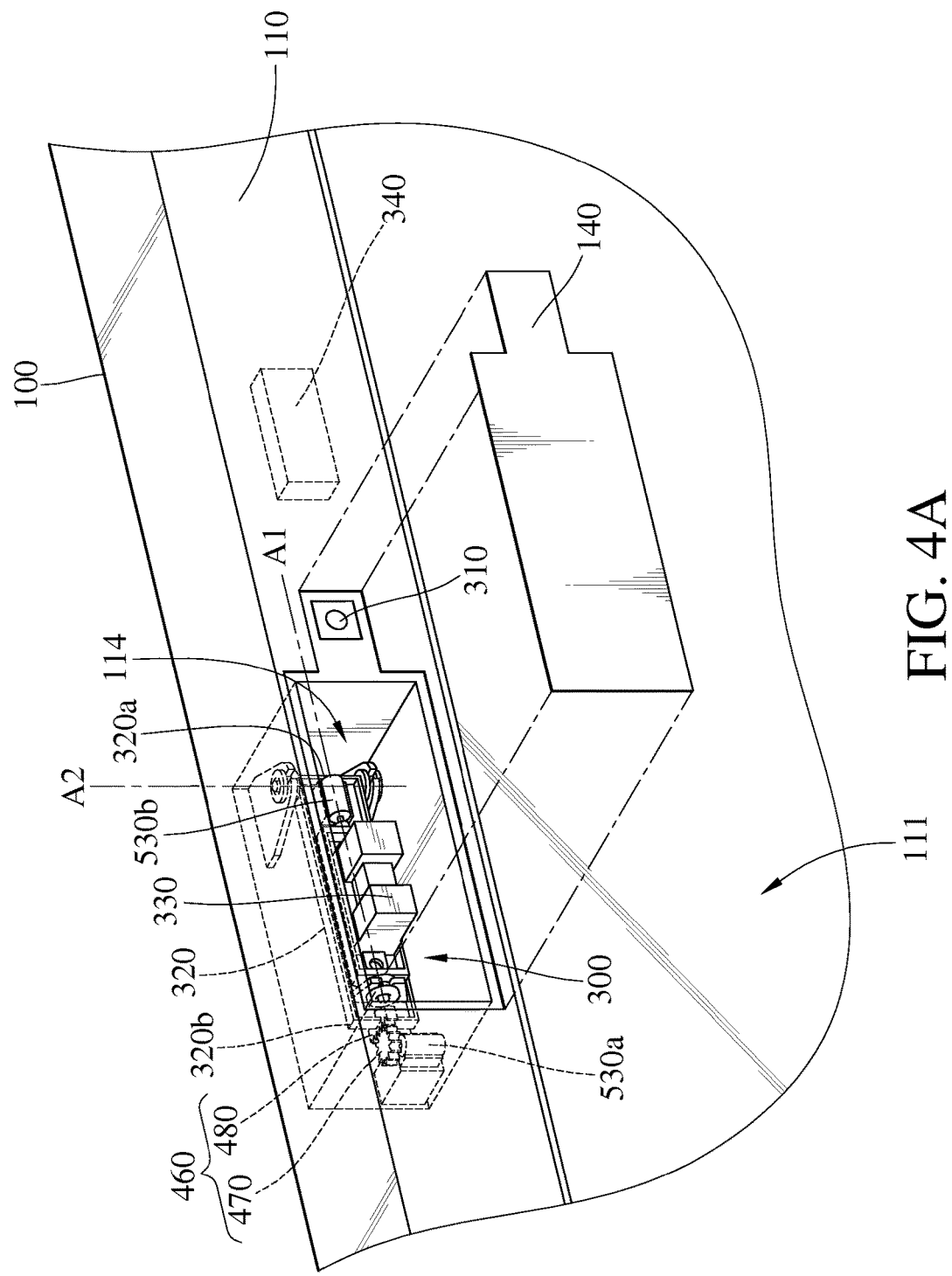
FIG. 4A is yet another partially exploded view of the display device in FIG. 1.
Figure 4:
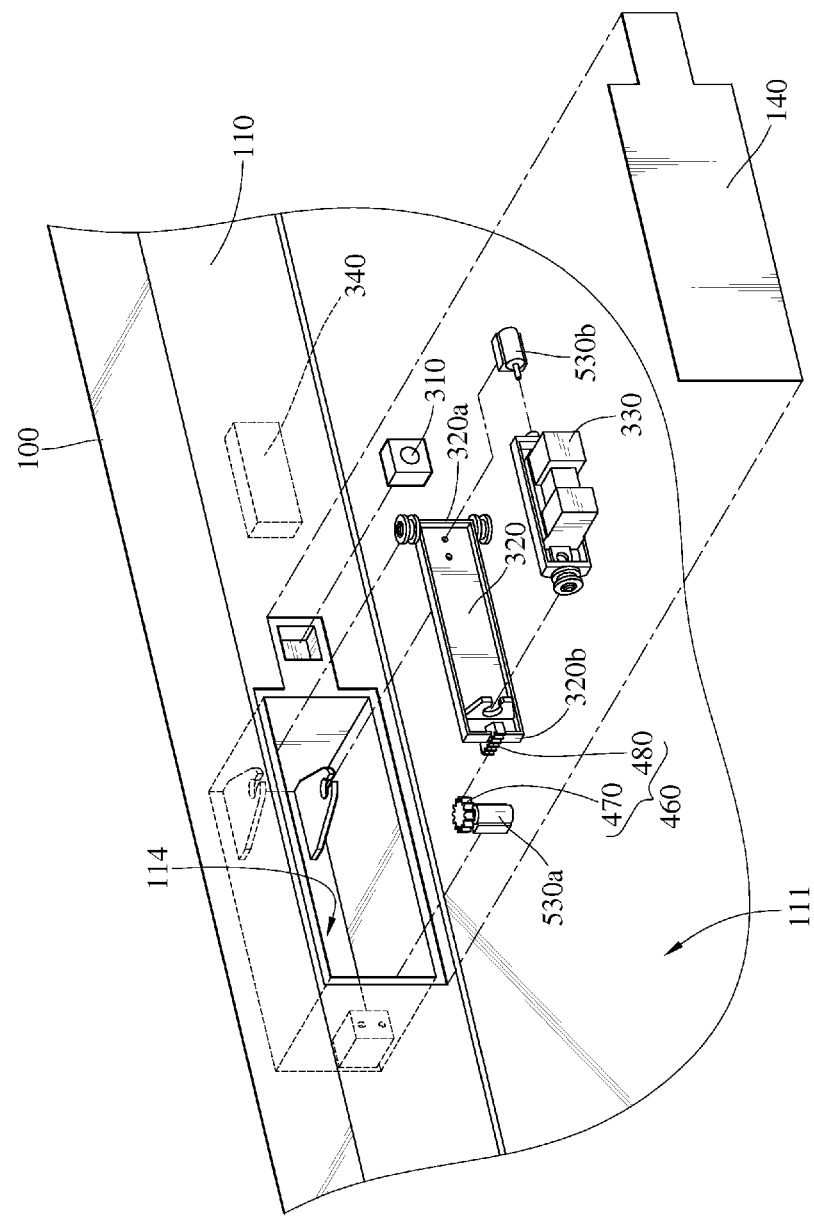
FIG. 4B is an exploded view of an adjustment module, a third transmission mechanism and a third drive module of the display device in FIG. 4A.

Please refer to FIG. 1 to FIG. 4B. FIG. 1 is a perspective view of a display device having a speaker module according to a first embodiment of the disclosure. FIG. 2A is a partially exploded view of the display device in FIG. 1. FIG. 2B is an exploded view of a first speaker module, a first transmission mechanism and a first drive module of the display device in FIG. 2A. FIG. 3A is another partially exploded view of the display device in FIG. 1. FIG. 3B is an exploded view of a second speaker module, a second transmission mechanism and a second drive module of the display device in FIG. 3A. FIG. 4A is yet another partially exploded view of the display device in FIG. 1. FIG. 4B is an exploded view of an adjustment module, a third transmission mechanism and a third drive module of the display device in FIG. 4A.

In the first embodiment, as shown in FIG. 1, the display device 10 having the speaker module comprises a display 100, an ultrasonic speaker group 200 and an adjustment module 300. As shown in FIG. 2 to FIG. 4B, the display 100 comprises a main body 110, a first sound-aperture cover 120, a second sound-aperture cover 130, and a light-pervious cover 140. The main body 110 has a display surface 111, a first accommodating slot 112 (as shown in FIG. 2B), a second accommodating slot 113 (as shown in FIG. 3B) and a third accommodating slot 114 (as shown in FIG. 4B). The first accommodating slot 112, the second accommodating slot 113 and the third accommodating slot 114 are located around the display surface 111. Additionally, the display surface 111 is located between the first accommodating slot 112 and the second accommodating slot 113. The first sound-aperture cover 120 covers the first accommodating slot 112, the second sound-aperture cover 130 covers the second accommodating slot 113, and the light-pervious cover 140 covers the third accommodating slot 114.

The ultrasonic speaker group 200 comprises a first speaker module 210, a second speaker module 220, a first transmission mechanism 400, a second transmission mechanism 430, a first drive module and a second drive module. In this embodiment, the first drive module comprises two first drive motors 510$a$ and 510$b$, the second drive module comprises two second drive motors 520$a$ and 520$b$.

As shown in FIG. 2A and FIG. 2B, the first speaker module 210 comprises a first seat 211 and a first speaker 212. The first transmission mechanism 400 comprises a first gear 410 and a first rack 420.

The first drive motor 510$a$ is disposed at the main body 110. The first gear 410 is assembled with an output shaft of the first drive motor 510$a$. The first seat 211 has a pivot end 211$a$ and an active end 211$b$. The pivot end 211$a$ of the first seat 211 pivots on the main body 110. The first rack 420 is connected to the active end 211$b$ of the first seat 211 and meshes with the first gear 410. When the first drive motor 510$a$ is actuated, the output shaft of the first drive motor 510$a$ drives the first gear 410 to rotate forward or reverse (namely, clockwise or counterclockwise), so as to drive the first seat 211 to rotate about a first axis A1 relative to the display 100. In this embodiment, the first axis A1 is parallel to a bottom edge 110$a$ of the main body 110.

The first drive motor 510$b$ is disposed at the first seat 211. An end of the first speaker 212 pivots on the first seat 211. The other end of the first speaker 212 is connected to an output shaft of the first drive motor 510$b$. When the first drive motor 510$b$ is actuated, the output shaft of the first drive motor 510$b$ drives the first speaker 212 to rotate (forward or reverse) about a second axis A2 relative to the first seat 211. In this embodiment, the second axis A2 is parallel to a side edge 110$b$ of the main body 110.

However, in this embodiment, the quantity of the first gear 410, for example, is one. In other embodiments, for example, the quantity of the first gear 410 is more than one, and each first gear 410 meshes with each other. Additionally, one of the first gears 410 is assembled with the output shaft of the first drive motor 510$a$. Another one of the first gears 410 meshes with the first rack 420, so as to drive the first seat 211 to rotate.

As shown in FIG. 3A and FIG. 3B, the second speaker module 220 comprises a second seat 221 and a second speaker 222. The second transmission mechanism 430 comprises a second gear 440 and a second rack 450. The second drive motor 520$a$ is disposed at the main body 110. The second gear 440 is assembled with an output shaft of the second drive motor 520$a$. The second seat 221 has a pivot end 221$a$ and an active end 221$b$. The pivot end 221$a$ of the second seat 221 pivots on the main body 110. The second rack 450 is connected to the active end 221$b$ of the second seat 221 and meshes with the second gear 440. When the second drive motor 520$a$ is actuated, the output shaft of the second drive motor 520$a$ drives the second gear 440 to rotate forward or reverse, so as to drive the second seat 221 to rotate about the first axis A1 relative to the display 100.

The second drive motor 520$b$ is disposed at the second seat 221. An end of the second speaker 222 pivots on the second seat 221. The other end of the second speaker 222 is connected to an output shaft of the second drive motor 520b. When the second drive motor 520b is actuated, the output shaft of the second drive motor 520b drives the second speaker 222 to rotate (forward or reverse) about the second axis A2 relative to the second seat 221.

To be noticed, in this embodiment, the quantity of the second gear 440 is two. However, the quantity of the second gear 440 is, but not limited to, two. For example, in other embodiments, the quantity of the second gear 440 is more than two, and each second gear 440 meshes with each other. Additionally, one of the second gears 440 is assembled with the output shaft of the second drive motor 520a. Another one of the second gears 440 meshes with the second rack 450, so as to drive the second seat 221 to rotate.

Figure 7:
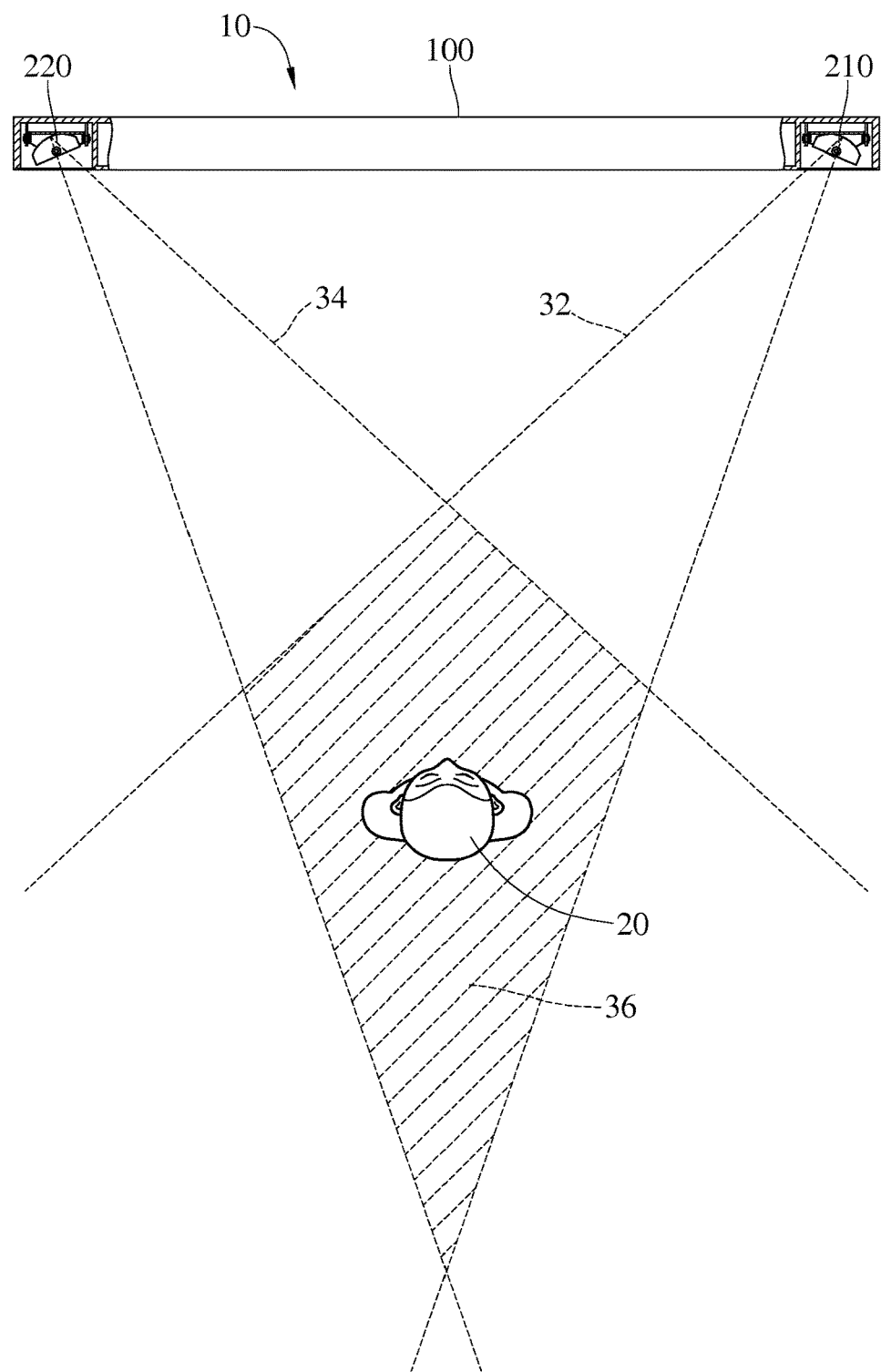
FIG. 7 and FIG. 8 are top views of the display device with the speaker module in FIG. 1 when being operated by the user.

Furthermore, as shown in FIG. 7, the first speaker 212 and the second speaker 222 are adapted to emit a first ultrasonic wave 32 and a second ultrasonic wave 34, respectively. Since the sound frequencies of the first ultrasonic wave 32 and the second ultrasonic wave 34 are beyond the hearing range of humans (namely, the range of frequencies that can be heard by humans), the first ultrasonic wave 32 and the second ultrasonic wave 34 are not singly audible, which means when only one of the first ultrasonic wave 32 and the second ultrasonic wave 34 transmits to a human, the human cannot hear the sound. Accordingly, the first ultrasonic wave 32 and the second ultrasonic wave 34 are intersected to form an audible region 36 (as shown in FIG. 7), and positions and ranges of the audible region 36 may be changed by moving the positions or orientations of the first speaker 212 and the second speaker 222 relative to the main body 110. The first ultrasonic wave 32 is interfered with the second ultrasonic wave 34 to form the audible region 36, such that the sound frequencies in the audible region 36 are adjusted to be in the hearing range of humans. Thus, only the sounds in the audible region 36 can be heard by humans in order to avoid bothering people outside the audible region 36.

The disclosure is not limited to the above-mentioned directions and orientations of the first axis A1 and the second axis A2. In other embodiments, for example, the first axis A1 and the second axis A2 are two different lines which are orthogonal to each other. Additionally, for example, the first speaker 212 and the second speaker 222 each rotate or spin relative to the main body 110. In other embodiments, for example, the first speaker 212 and the second speaker 222 each slide to move relative to the main body 110. Furthermore, in this embodiment, for example, the ends of the first speaker 212 and the second speaker 222 are connected to the output shafts of the first drive motor 510b and the second drive motor 520b respectively. In other embodiments, for example, the ends of the first speaker 212 and the output shaft of the first drive motor 510b are not coaxial, and the second speaker 222 and the output shaft of the second drive motor 520b are not coaxial. Nevertheless, for example, the first drive motor 510b and the second drive motor 520b drive the first speaker 212 and the second speaker 222 to rotate by gears or belts, respectively.

As shown in FIG. 4A and FIG. 4B, the adjustment module 300 comprises a photographic component 310, two third drive motors 530a, 530b, a third transmission mechanism 460, a third seat 320, a distance sensing component 330 and a control component 340. Additionally, the third transmission mechanism 460 comprises a third gear 470 and a third rack 480. For example, the photographic component 310 (such as a lens) is affixed to the main body 110 for photographing a user 20 and obtaining a user image. In other embodiments, for example, the photographic component 310 is affixed to the main body 110 indirectly via an adjusting seat with variable angles.

The third drive motor 530a is disposed at the main body 110. The third gear 470 is assembled with an output shaft of the third drive motor 530a. The third seat 320 has a pivot end 320a and an active end 320b. The pivot end 320a of the third seat 320 pivots on the main body 110. The third rack 480 is connected to the active end 320b of the third seat 320 and meshes with the third gear 470. When the third drive motor 530a is actuated, the output shaft of the third drive motor 530a drives the third gear 470 to rotate forward or reverse, so as to drive the third seat 320 to rotate about the second axis A2 relative to the display 100.

The third drive motor 530b is disposed at the third seat 320, and the distance sensing component 330 (such as an infrared rangefinder) pivots on the third seat 320. The third drive motor 530b drives the distance sensing component 330 to rotate about the first axis A1 relative to the third seat 320. Additionally, the distance sensing component 330 is adapted to obtain at least one user distance data according to the user image.

To be noticed, in this embodiment, the quantity of the third gear 470 is two. However, the quantity of the third gear 470 is, but not limited to, two. For example, in other embodiments, the quantity of the third gear 470 is more than two, and each third gear 470 meshes with each other. Additionally, one of the third gears 470 is assembled with the output shaft of the third drive motor 530a. Another one of the third gears 470 meshes with the third rack 480, so as to drive the third seat 320 to rotate.

As shown in FIG. 7, for example, the control component 340 (such as a processor) is adapted to control the first speaker 212 and the second speaker 22 to rotate relative to the display 100 according to the at least one user position data (such as a distance between the user 20 and the distance sensing component 330, a distance between the distance sensing component 330 and the photographic component 310, and a distance between each speaker module and the distance sensing component 330), so as to drive the audible region 36 to target the at least one user 20.

Figure 5A:
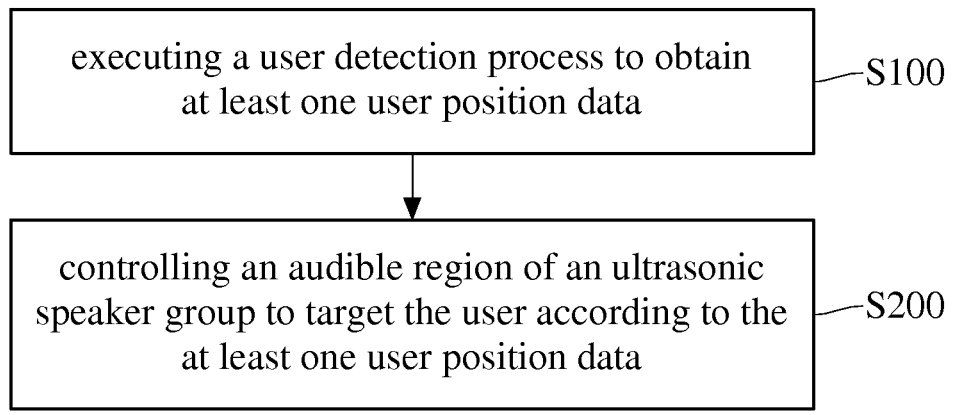
FIG. 5A and FIG. 5B are flow diagrams of control methods of the display device having the speaker module in FIG. 1.
Figure 5B:
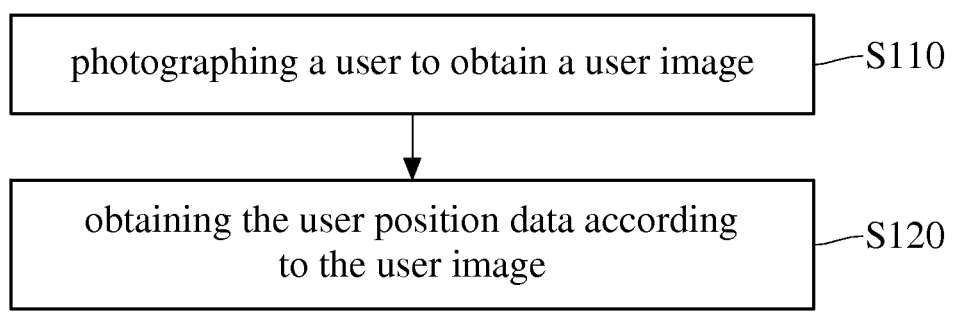

Please refer to FIG. 5A and FIG. 5B which are flow diagrams of control methods of the display device having the speaker module in FIG. 1. First, as shown in step S100, the adjustment module 300 is adapted to execute a user detection process, for obtaining at least one user position data of an user 20 (as shown in FIG. 7). Then, as shown in step S110, the user detection process means that the photographic component 310 is adapted to statically or dynamically photograph the user 20 and the place where the user 20 stays, to obtain a user image. Additionally, the photographic component 310 is adapted to identify a position of a nose of the user 20 (an exemplary target) by employing face identification technology.

Furthermore, the detected timing of the user detection process may be immediate, predetermined-time or user-defined. In this embodiment, the detected timing of the user detection process is user-defined, to avoid affecting the accuracy of the user detection process due to the movement of the user 20. In other words, when the display device 10 is used for the first time or when user is changed, the user 20 executes the user detection process.

Then, as shown in step S120, the two third drive motors 530a and 530b drive the distance sensing component 330 to target the nose of the user 20, for obtaining the user position data by detecting the distance between the user 20 and the distance sensing component 330.

Then, as shown in step S200, for example, an audible region 36 of an ultrasonic speaker group 200 is controlled to target the user 20 according to the user position data. In other words, a rotational angle of the first speaker module 210 of the ultrasonic speaker group 200 and a rotational angle of the second speaker module 220 of the ultrasonic speaker group 200 may be adjusted according to the user position data, so as to drive the audible region 36 of the ultrasonic speaker group 200 to target the user 20.

Figure 6:
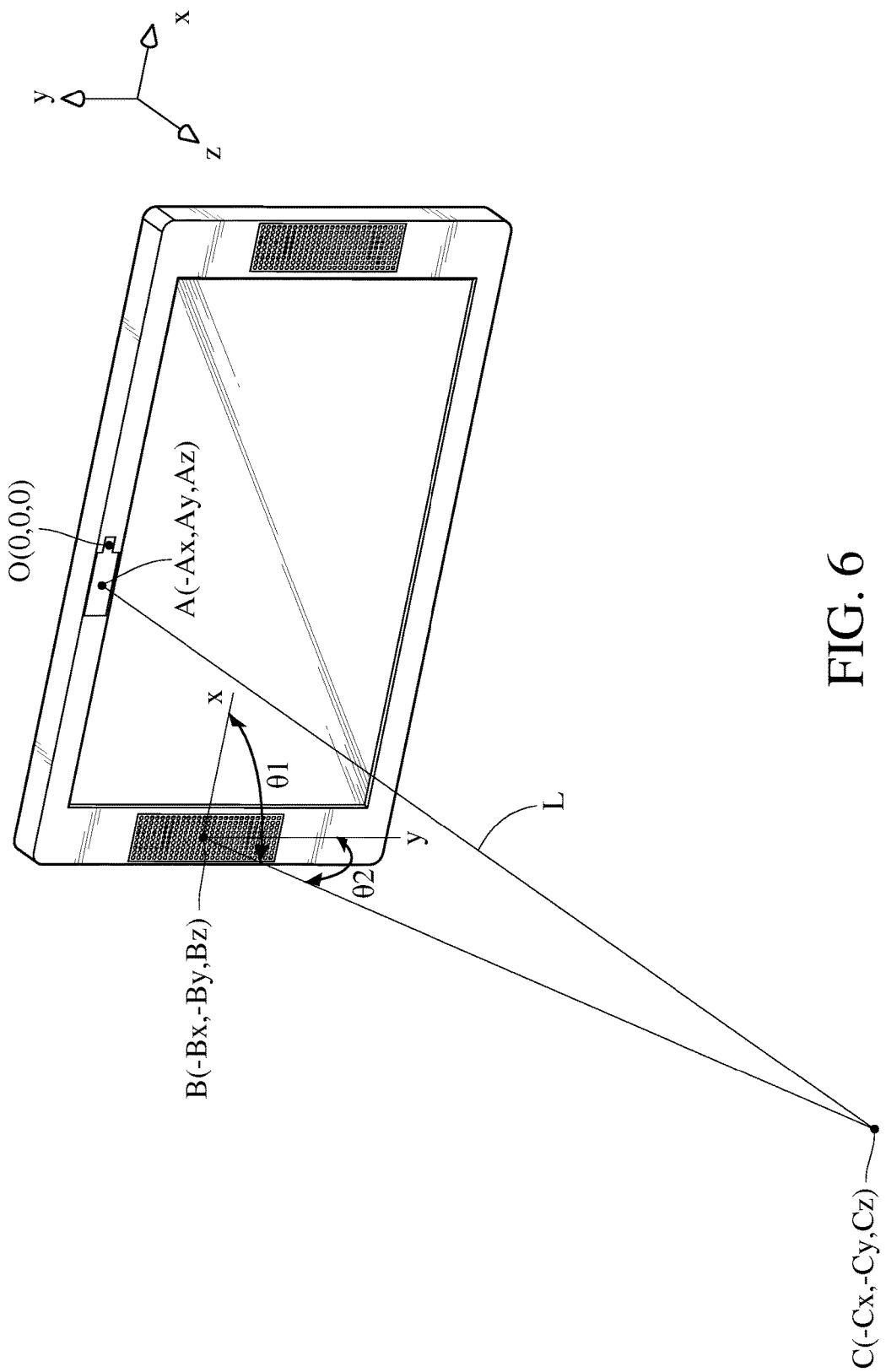
FIG. 6 is a perspective view showing a relationship between of the display device with the speaker module in FIG. 1 and a user.

How to calculate the rotational angle of first speaker module 210 and the rotational angle of the second speaker module 220 will be described as follows. Please refer to FIG. 6 which is a perspective view showing a relationship between of the display device with the speaker module in FIG. 1 and a user. Assume that the three dimensional coordinate of the center of the photographic component 310 is the original point O(0,0,0). Additionally, the point of the distance sensing component 330 is A(−74.125,0,0) and the center of the second speaker module 220 is B(−429.875, −307.51, 0) are assumed to be known. When both of the distance L between the nose of the user 20 and the distance sensing component being 2032.59 millimeters and the direction relative to the distance sensing component are detected by the distance sensing component 330, the control component 340 calculates the coordinate of the nose of the user 20 is the point C(−225.875, −207.51, 2009.31).

Additionally, all values of an included angle θ1 between X-axis (such as the first axis A1) and the segment B-C and an included angle θ2 between Y-axis (such as the first axis A2) and the segment B-C are calculated by the control component 340. The included angle θ1 is 84.2028 degrees, and the rotational angle of the second speaker 222 is 5.7972 degrees (that is, 90−84.2028=5.7972, the second speaker 222 rotates 2.8492 degrees counterclockwise about the first axis A1). The included angle θ2 is 87.1508 degree, and the rotational angle of the second speaker 222 is 5.7972 degree (that is, 90−87.1508=2.8492, the second speaker 222 rotates counter-clockwise 2.8492 degrees about the first axis A1). Thus, the nose of the user 20 is targeted by the control component 340 according to the rotational angle of the second seat 221 and the rotational angle of the second speaker 222.

Similarly, the rotational angle of the first seat 211 and the rotational angle of the first speaker 212 can be calculated by the control component 340. Accordingly, the nose of the user 20 is targeted by the first speaker module 210 according to the rotational angle of the first seat 211 and the rotational angle of the first speaker 212. Thus, the audible region 36 is adjusted to target (namely, align with) the user 20. In other words, the audible region 36 surrounds (covers) ears of the user 20.

Figure 8:
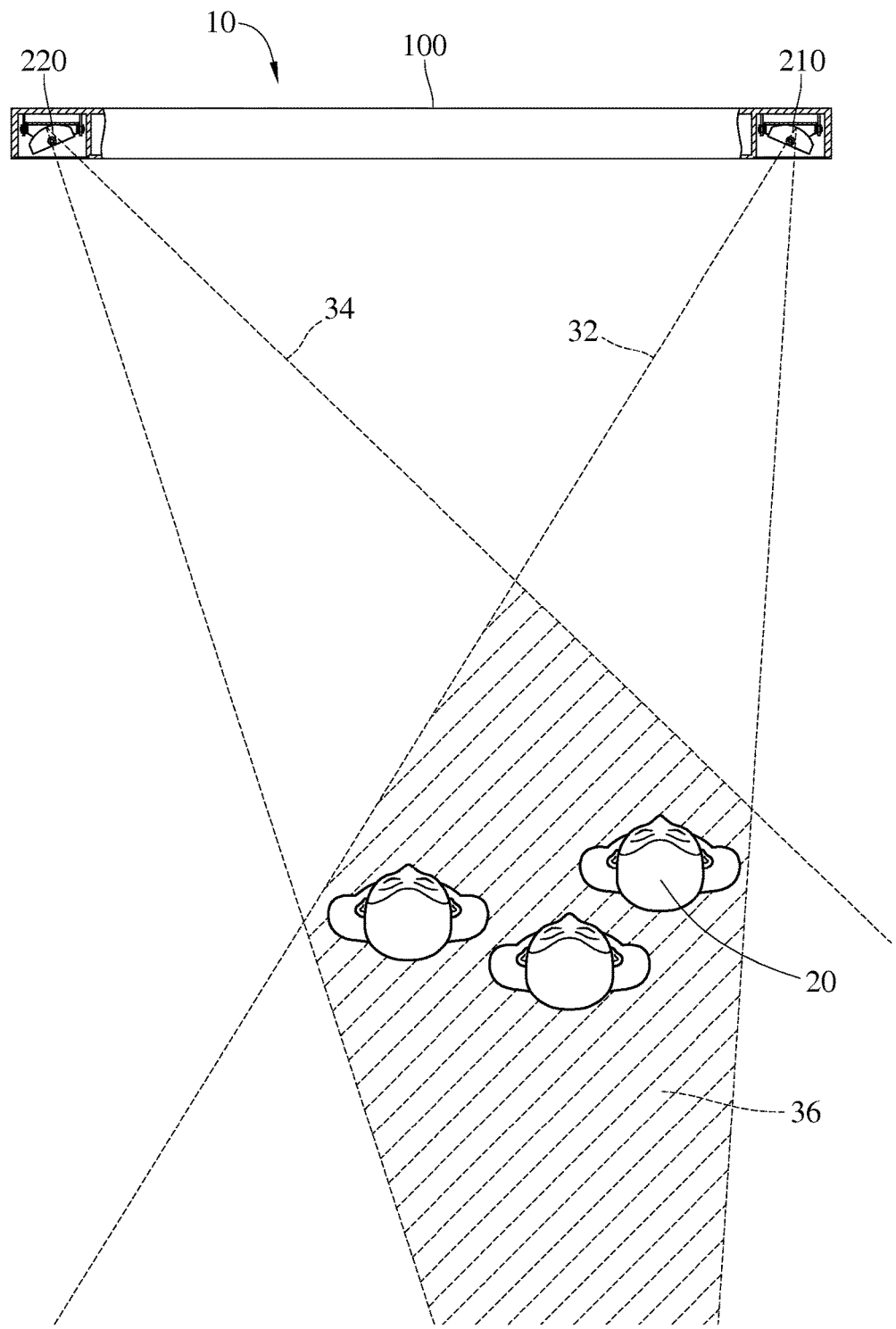

Please refer to FIG. 7 and FIG. 8 which are top views of the display device with the speaker module in FIG. 1 when being operated by the user. As shown in FIG. 7, in this embodiment, the quantity of the user 20 is one. The user 20 can control the adjustment module 300 to calculate the user detection process and the rotational angle, such that the user 20 is targeted by the first speaker module 210 and the second speaker module 220 and the audible region 36 surrounds the user 20.

As shown in FIG. 8, when the quantity of the users 20 is more than one, and some users 20 are out of the audible region 36, the user 20 can control the adjustment module 300 to calculate the user detection process and the rotational angle again, for adjusting the audible region 36 to surround all users.

Figure 9:
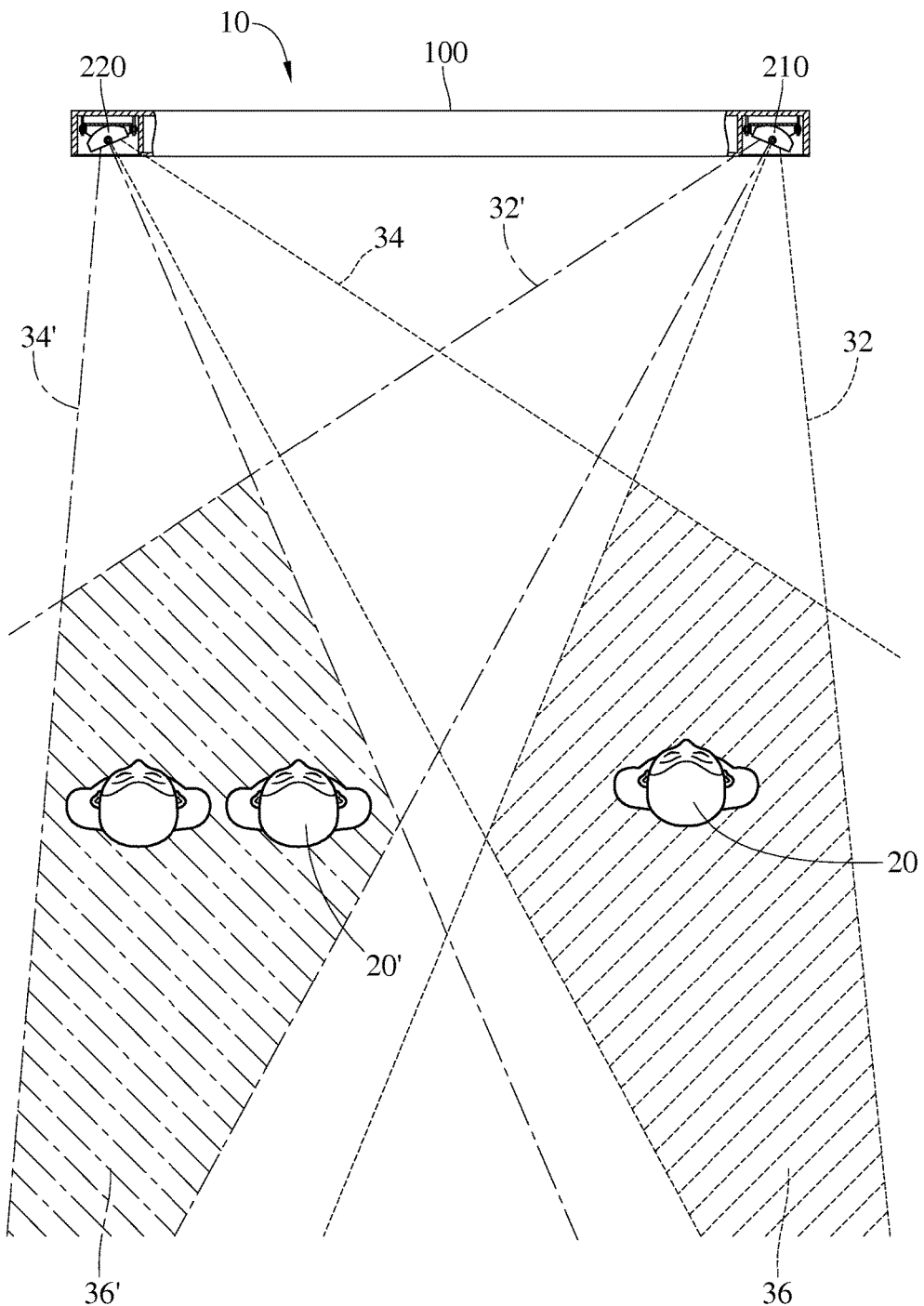
FIG. 9 is a top view of a display device having the speaker module when being operated by a user according to a second embodiment of the disclosure.

Please refer to FIG. 9 which is a top view of a display device having the speaker module when being operated by a user according to a second embodiment of the disclosure. Since the second embodiment is similar to the first embodiment in FIG. 1, only the difference between the second embodiment and the first embodiment will be described as follows.

In this embodiment, the quantity of the ultrasonic speaker group 200 is two. Accordingly, when the quantity of the users 20/20' is more than one, and each user 20/20' sits at two opposite sides of the display device respectively, the adjustment module 300 drives one of the two ultrasonic speaker groups 200 to form an audible region 36 by intersecting the first ultrasonic wave 32 and the second ultrasonic wave 34. Additionally, the adjustment module 300 drives the other ultrasonic speaker groups 200 (not shown in FIG. 9) to form an audible region 36' by intersecting the first ultrasonic wave 32' and the second ultrasonic wave 34'. The audible regions 36 and 36' surround the first user 20 and the second user 20' respectively, such that both of the first user 20 and the second user 20' which are separated by a certain distance can hear the sound. Nonetheless, in some embodiments, the two ultrasonic speaker groups 200 are adapted to output language sounds to the same place, respectively, such that users 20 can hear different sounds with different languages corresponding to their positions located in the respective audible regions 36 and 36', respectively.

Figure 10:
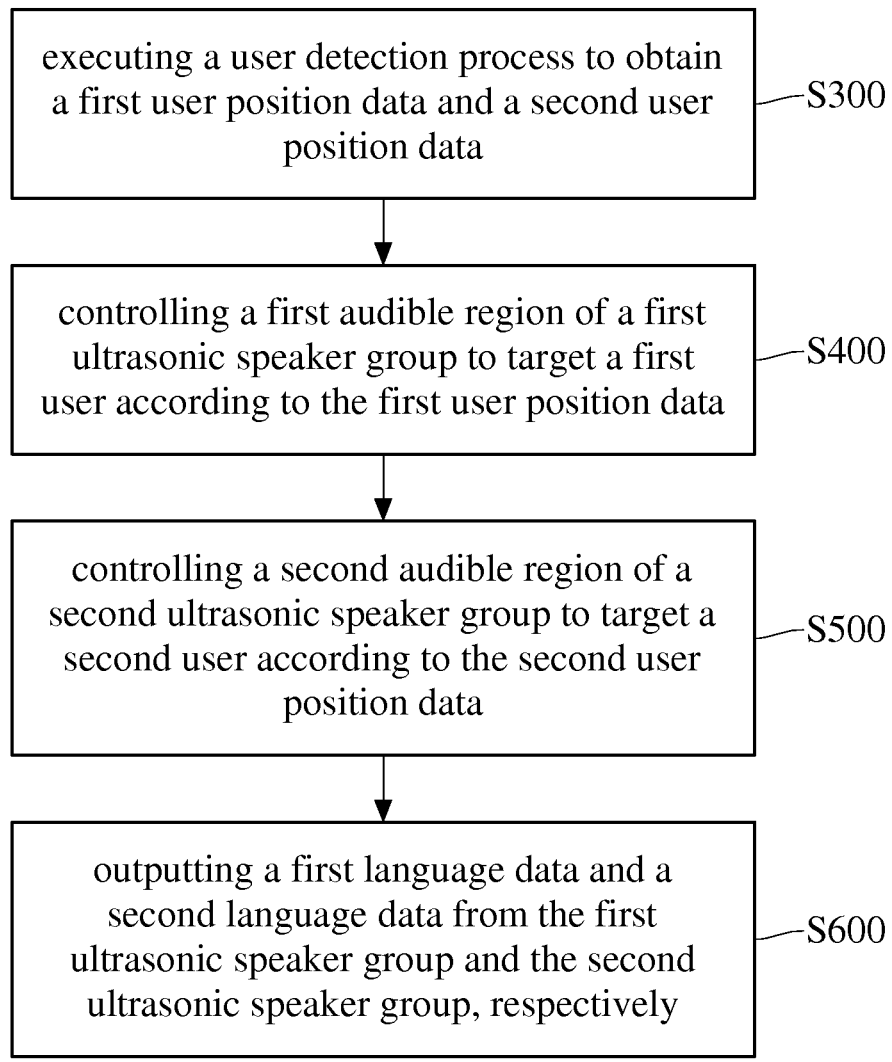
FIG. 10 is a flow diagram of a method for synchronously playing multi-language audio according to a third embodiment of the disclosure.

Please refer to FIG. 9 and FIG. 10. FIG. 10 is a flow diagram of a method for synchronously playing multi-language audio according to a third embodiment of the disclosure. As shown in step S300 that executing a user detection process to obtain a first user position data of a first user 20 and a second user position data of a second user 20'. Since the step S300 is similar to the above-mentioned step S100, it will not be repeated again hereinafter.

As shown in step S400, a first audible region 36 of a first ultrasonic speaker group is controlled to target the first user 20 according to the first user position data. As shown in step S500, a second audible region 36' of a second ultrasonic speaker group is controlled to target a second user 20' according to the second user position data. Since the steps S400 and S500 are similar to the step S200, they will not be repeated again hereinafter.

As shown in step S600, a first language data and a second language data are output from the first ultrasonic speaker group and the second ultrasonic speaker group, respectively. For example, if the first user 20 is a Chinese user, then the first language data is a Chinese signal to meet the needs of the user 20. Alternatively, if the first user 20 is an English user, then the second language data is an English signal to meet the needs of the second user 20'. For example, the user 20 located within the audible region 36 can only hear the English sound and the second user 20' located within the audible region 36' can only hear the Chinese sound at the same time.

Figure 11:
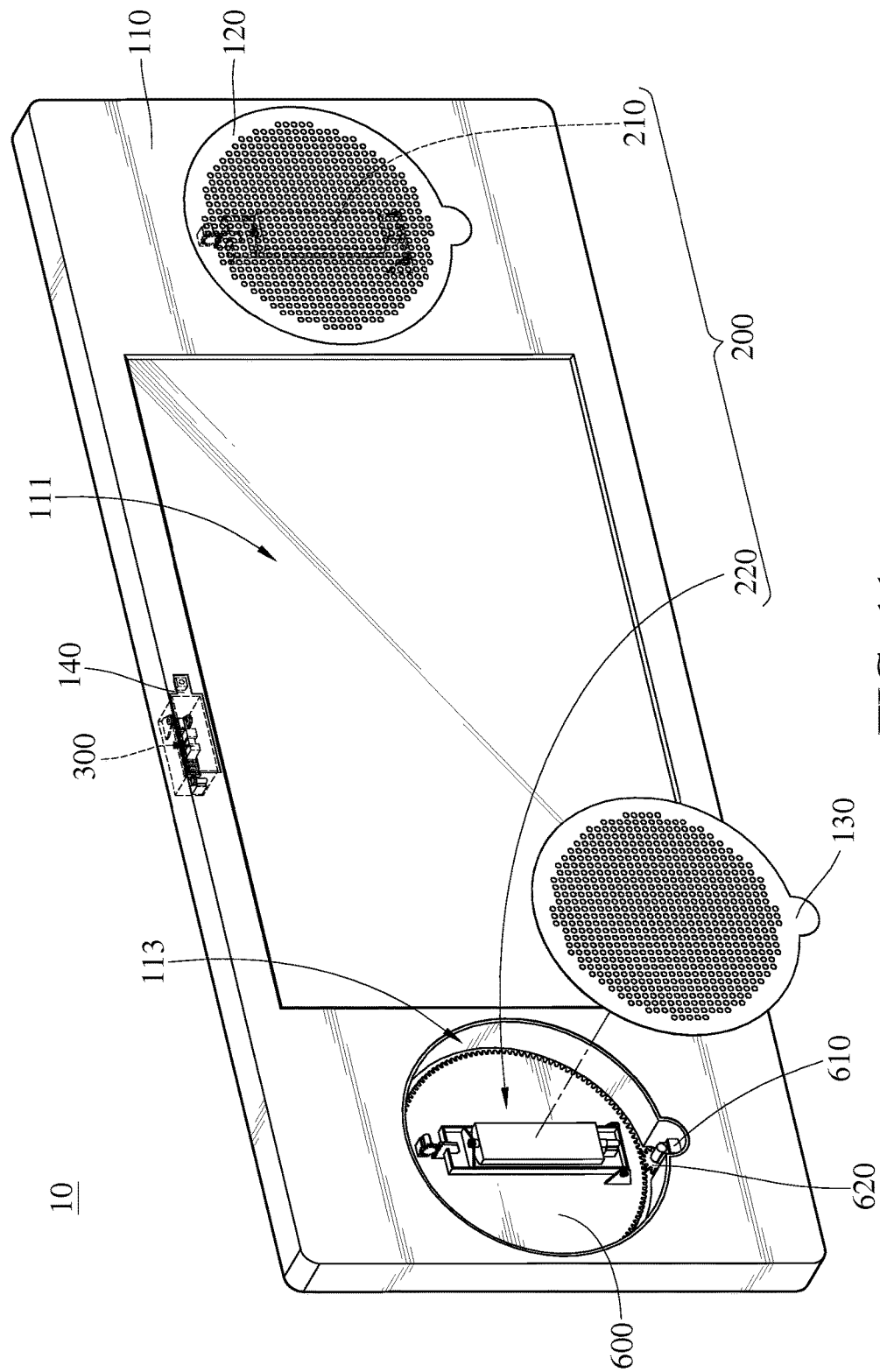
FIG. 11 is a perspective view of a display device having a speaker module according to a fourth embodiment of the disclosure.

For example, the speakers are adapted to rotate about two axes which are orthogonal, and rotate relative to the display 100. In other embodiments, the speakers are capable of rotating about three axes which are orthogonal, and rotating relative to the display 100. Please refer to FIG. 11 which is a perspective view of a display device having a speaker module according to a fourth embodiment of the disclosure. Since the fourth embodiment is similar to the first embodiment in FIG. 1, only the difference between the fourth embodiment and the first embodiment will be described as follows.

In this embodiment, the ultrasonic speaker group 200 further comprises two rotating seats 600, two fourth drive motors 610 and two transmission gears 620. Take one set of the rotating seat 600, the fourth drive motor 610 and the transmission gear 620 for example, the rotating seat 600 pivots on the main body 110 and has gear teeth at its edge. The fourth drive motor 610 is affixed to the main body 110. The transmission gear 620 is assembled with an output shaft of the fourth drive motor 610. When the fourth drive motor 610 is actuated, the output shaft of the fourth drive motor 610 drives the transmission gear 620 to rotate forward or reverse, so as to drive the rotating seat 600 to rotate about a third axis relative to the display 100. Additionally, the third axis is parallel to a normal line (direction) of the display surface 111.

Figure 12:
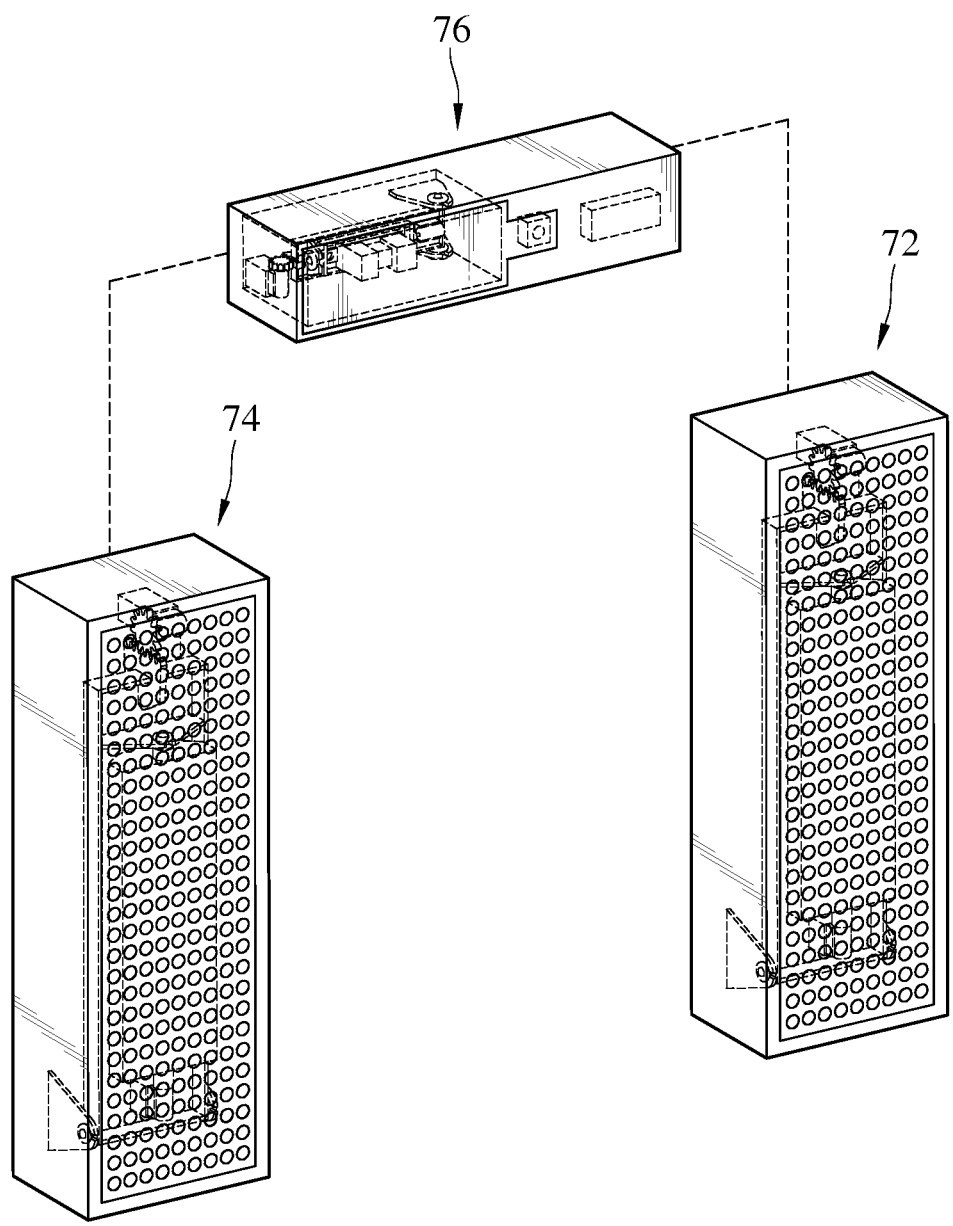
FIG. 12 is a schematic perspective view of an audio adjustment system according to a fifth embodiment of the disclosure.
Figure 13:
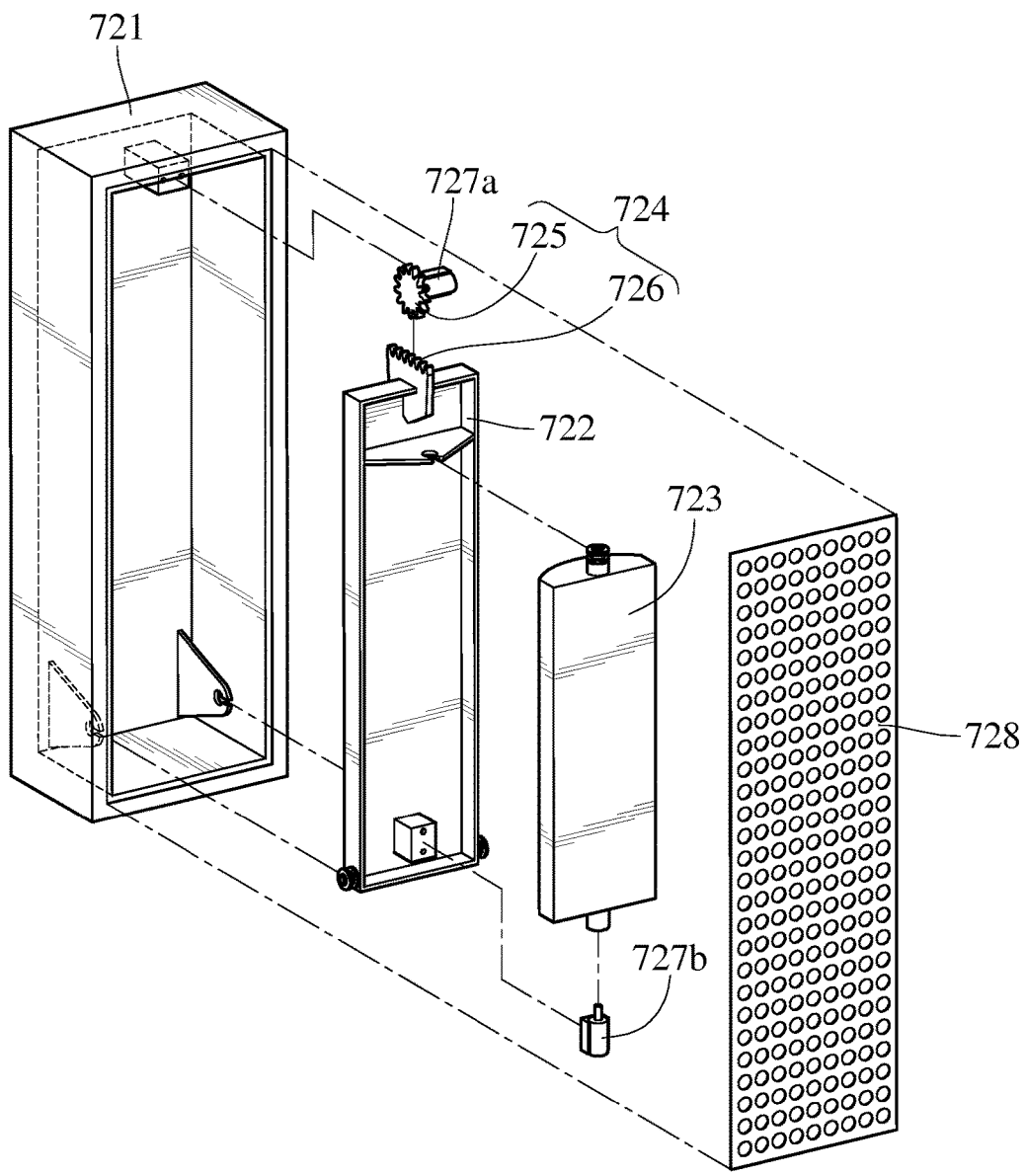
FIG. 13 is an exploded view of a speaker module of the audio adjustment system in FIG. 12.

Please refer to FIG. 12 and FIG. 13. FIG. 12 is a schematic perspective view of an audio adjustment system according to a fifth embodiment of the disclosure. FIG. 13 is an exploded view of a speaker module of the audio adjustment system in FIG. 12. For example, the ultrasonic speaker group 200 is applied for the display device. In this embodiment, the audio adjustment system 70 comprises a first speaker module 72, a second speaker module 74 and an adjustment module 76.

The first speaker module 72 comprises a first shell 721, a first seat 722, a first speaker 723, a first transmission mechanism 724, two first drive motors 727a, 727b and a first sound-aperture cover 728. The first transmission mechanism 724 comprises a first gear 725 and a first rack 726. The first drive motor 727a is affixed to and located in the first shell 721. The first gear 725 is assembled with an output shaft of the first drive motor 727a.

An end of the first seat 722 pivots on the first shell 721. The first rack 726 is connected to the other end of the first seat 722 and meshes with the first gear 725. When the first drive motor 727a is actuated, the output shaft of the first drive motor 727a drives the first gear 725 to rotate forward or reverse, so as to drive the first seat 722 to rotate about a first axis A1 relative to first shell 721.

The first drive motor 510b is disposed at the first seat 722. An end of the first speaker 723 pivots on the first seat 722. The other end of the first speaker 723 is connected to an output shaft of the first drive motor 727b. When the first drive motor 727b is actuated, the output shaft of the first drive motor 727b drives the first speaker 723 to rotate (forward or reverse) about a second axis A2 relative to the first seat 722.

Similarly, the second speaker module 220 comprises a second shell, a second seat 221, a second speaker 222, a second transmission mechanism 430, two second drive motors 520a and a second sound-aperture cover 130. Additionally, the second transmission mechanism 430 comprises a second gear 440 and a second rack 450 (not shown in FIGS. 12 and 13).

The first speaker module 210 and the second speaker module 220 are coupled to the adjustment module 300 respectively. The control method for the audio adjustment system 70 is similar to the control method for the display device 10 having the speaker module, and it will not be repeated again.

According to the speaker module, the display device having speaker module, the audio adjustment system and the control method thereof, and the synchronization method for playing multi-language sound of the disclosure, since the ultrasonic speaker group is moveable, the user can adjust the rotational angle of the first speaker module and the rotational angle of the second speaker module. Thus, the audible region formed by the first speaker module and the second speaker module is adapted to target the user.

Additionally, the adjustment module may be adapted to calculate the rotational angle of the first speaker module and the rotational angle of the second speaker module according to the distance between the distance sensing component and the user. Accordingly, the audible region may be adapted to target the user according to the rotational angle of the first speaker module and the rotational angle of the second speaker module.

Furthermore, when the quantity of the ultrasonic speaker group is more than one, each ultrasonic speaker group may output different output sounds respectively, such that the different users can hear different sounds, respectively. Moreover, when the different output sounds are the sounds with different language, different users can hear the different language sounds synchronously without interfering others or hearing other undesired languages.

The disclosure will become more fully understood from the said embodiment for illustration only and thus does not limit the disclosure. Any modifications within the spirit and category of the disclosure fall in the scope of the disclosure.

What is claimed is:

1. A display device having a speaker module, comprising:
   a display having a display surface, a first accommodating slot, and a second accommodating slot, the display surface being located between the first accommodating slot and the second accommodating slot; and
   an ultrasonic speaker group, comprising:
     at least one first speaker module comprising:
       a first seat pivoting on the display, for rotating about a first axis relative to the display; and
       a first speaker pivoting on the first seat, for rotating about a second axis relative to the first seat, wherein the first seat and the first speaker are disposed in the first accommodating slot, the first speaker is adapted to emit a first ultrasonic wave, and the first axis and the second axis are orthogonal;
     at least one second speaker module comprising:
       a second seat pivoting on the display, for rotating about the first axis relative to the display; and
       a second speaker pivoting on the second seat, for rotating around the second axis relative to the second seat, wherein the second seat and the second speaker are disposed in the second accommodating slot, the second speaker is adapted to emit a second ultrasonic wave, and the first ultrasonic wave and the second ultrasonic wave are intersected to form an audible region by rotating at least one of the at least one first speaker and the at least one second speaker relative to the display; and
     an adjustment module comprising:
       a photographic component disposed at the display, for photographing and obtaining a user image;
       a distance sensing component disposed at the display, for obtaining at least one user distance data according to the user image; and
       a control component adapted to control the first speaker and the second speaker to rotate relative to the display, so as to drive the audible region to target at least one user.

2. The display device having the speaker module according to claim 1, wherein the ultrasonic speaker group further comprises a first transmission mechanism, and the first transmission mechanism comprises:

a first gear rotatably disposed at the display; and
a first rack disposed at the first seat, wherein the first gear meshes with the first rack for rotating relative to display, so as to drive the first seat to rotate about the first axis relative to the display.

3. The display device having the speaker module according to claim 2, wherein the ultrasonic speaker group further comprises a first drive module comprising two first drive motors, one of the two first drive motors is disposed at the display, for driving the first gear to rotate relative to the display, and the other first drive motor is disposed at the first seat, for driving the first speaker to rotate relative to the first seat.

4. The display device having the speaker module according to claim 3, wherein the ultrasonic speaker group further comprises a second transmission mechanism, and the second transmission mechanism comprises:
a second gear rotatably disposed at the display; and
a second rack disposed at the second seat, wherein the second gear meshes with the second rack for rotating relative to display, so as to drive the second seat to rotate about the first axis relative to the display.

5. The display device having the speaker module according to claim 4, wherein the ultrasonic speaker group further comprises a second drive module comprising two second drive motors, one of the two second drive motors is disposed at the display, for driving the second gear to rotate relative to the display, and the other second drive motor is disposed at the second seat, for driving the second speaker to rotate relative to the second seat.

6. The display device having the speaker module according to claim 5, wherein the display has a third accommodating slot, the first accommodating slot, the second accommodating slot and the third accommodating slot are located around the display surface the adjustment module is disposed in the third accommodating slot.

7. The display device having the speaker module according to claim 5, wherein the adjustment module further comprises a third seat pivoting on the display, for rotating about the second axis relative to the display, wherein the distance sensing component pivots on the third seat such that the distance sensing component is capable of rotating about the first axis relative to the second seat.

8. A display device having a speaker module, comprising:
a display; and
an ultrasonic speaker group, comprising:
at least one first speaker module comprising:
a first seat having a first end and a second end opposite to each other, the first end pivoting on the display, for rotating about a first axis relative to the display; and
a first speaker pivoting on the first seat and locate between the first end and the second end of the first seat, for rotating about a second axis relative to the first seat, wherein the first speaker is adapted to emit a first ultrasonic wave, and the first axis and the second axis are orthogonal;
at least one second speaker module comprising:
a second seat having a third end and a fourth end opposite to each other, the third end pivoting on the display, for rotating about the first axis relative to the display; and
a second speaker pivoting on the second seat and locate between the third end and the fourth end of the second seat, for rotating around the second axis relative to the second seat, wherein the second speaker is adapted to emit a second ultrasonic wave, and the first ultrasonic wave and the second ultrasonic wave are intersected to form an audible region by rotating at least one of the at least one first speaker and the at least one second speaker relative to the display; and
a first transmission mechanism, comprising:
a first gear rotatably disposed at the display; and
a first rack disposed at the second end of the first seat, wherein the first gear meshes with the first rack for rotating relative to display, so as to drive the first seat to rotate about the first axis relative to the display;
a second transmission mechanism, comprising:
a second gear rotatably disposed at the display; and
a second rack disposed at the fourth end of the second seat, wherein the second gear meshes with the second rack for rotating relative to display, so as to drive the second seat to rotate about the first axis relative to the display; and
an adjustment module comprising:
a photographic component disposed at the display, for photographing and obtaining a user image;
a distance sensing component disposed at the display, for obtaining at least one user distance data according to the user image; and
a control component adapted to control the first speaker and the second speaker to rotate relative to the display, so as to drive the audible region to target at least one user.

9. The display device having the speaker module according to claim 8, wherein the ultrasonic speaker group further comprises a first drive module comprising two first drive motors, one of the two first drive motors is disposed at the display, for driving the first gear to rotate relative to the display, and the other first drive motor is disposed at the first seat, for driving the first speaker to rotate relative to the first seat.

10. The display device having the speaker module according to claim 8, wherein the ultrasonic speaker group further comprises a second drive module comprising two second drive motors, one of the two second drive motors is disposed at the display, for driving the second gear to rotate relative to the display, and the other second drive motor is disposed at the second seat, for driving the second speaker to rotate relative to the second seat.

11. The display device having the speaker module according to claim 8, wherein the adjustment module further comprises a third seat pivoting on the display, for rotating about the second axis relative to the display, wherein the distance sensing component pivots on the third seat such that the distance sensing component is capable of rotating about the first axis relative to the second seat.

12. The display device having the speaker module according to claim 8, wherein the display has a display surface, a first accommodating slot, a second accommodating slot and a third accommodating slot, the first accommodating slot, the second accommodating slot and the third accommodating slot are located around the display surface, the display surface is located between the first accommodating slot and the second accommodating slot, wherein the first speaker module is disposed in the first accommodating slot, the second speaker module is disposed in the second accommodating slot, and the adjustment module is disposed in the third accommodating slot.

* * * * *